Patented Aug. 27, 1946

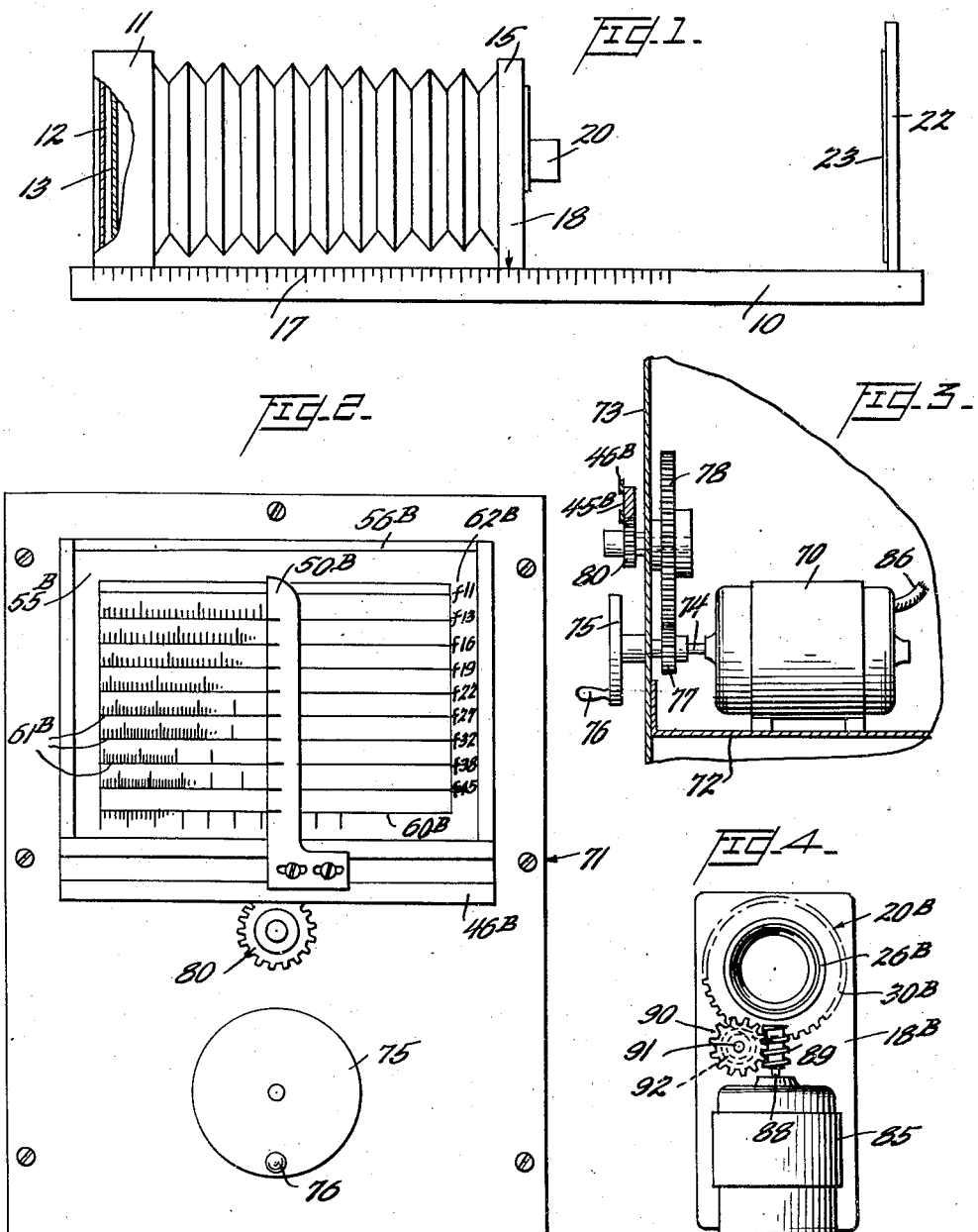

2,406,550

UNITED STATES PATENT OFFICE 2,406,550

DIAPHRAGM CONTROL

Henry R. Long, Linden, N. J., assignor to American Type Founders, Inc., Elizabeth, N. J., a corporation of New Jersey Application August 29, 1942, Serial No. 456,686

2 Claims. (Cl. 95—64)

1

This invention relates to process photography and more particularly to apparatus and methods for use in connection with process reproduction work, including both continuous tone and half-tone operations.

The invention involves the provision of certain simplified procedures and means for determining the setting of the diaphragm opening or lens aperture of a process camera for each exposure, in accordance with the screen separation, the bellows extension, the light intensity changes resulting from variations in bellows extension, and other factors affecting said setting, without resort to complicated mathematical computations.

The present invention also has to do with the provision, in connection with such means and methods of procedure, of readily adjustable or interchangeable devices, whereby the settings referred to may be made in accordance with the various theories now extant regarding the computations or points of reference to be employed in arriving at the proper lens adjustments.

The principal object is to provide a system for the remote control of the lens adjustment according to the various factors involved and the various systems pursued.

Other objects and features of novelty will be apparent from the following specification when read in connection with the accompanying drawing in which certain embodiments of the invention are illustrated by way of example.

In the drawing:

Figure 1 is a diagrammatic view in side elevation of a process camera arranged for various types of reproduction work;

Figure 2 is a view in front elevation of the actuating unit of a remote control device for adjusting the diaphragm, the interchangeable dial shown in this view being graduated for use in half-tone work involving the "multiple f system";

Figure 3 is a view in side elevation of the same unit; and

Figure 4 is a view in front elevation of a lens board carrying the complementary unit of the remote control arrangement.

Referring now more particularly to Figure 1 of the drawing, it will be seen that the camera table or support is indicated by the reference numeral 10 and this support carries the relatively fixed rear portion 11 of the camera which contains the plate 12 which is coated with the emulsion which forms the negative of the reproduction upon exposure. The part 11 of the camera is also provided with means for supporting and

2 adjusting a half-tone screen 13 for use in this type of reproduction work. The half-tone screen 13 may be accurately set at different distances from the emulsion on the plate 12 by mechanism (not shown) on the camera itself, or by means of calibrated wedges, as well known in the art.

The forward portion 15 of the camera is adjustable along the table 10 and is connected with the rear portion 11 by means of the bellows 16. The part 15 of the camera comprises essentially a lens board 18 which carries the lens assembly 20 and the various parts of the diaphragm control mechanism. The part 15 is provided with a suitable marking which when referred to the scale 17 on the table 10 will afford a reading of the bellows extension of the camera in inches, that is, the distance between the lens aperture and the emulsion on the plate 12. A copy board 22 carrying the sheet of copy 23 is adjustably mounted on the table 10 for positioning the copy at the proper distance from the camera. The copy may be illuminated by any suitable source of light (not shown).

The lens assembly 20 includes an adjustable aperture preferably of the iris diaphragm type, and any suitable or conventional type of shutter mechanism.

The setting of the diaphragm opening may be considered as the ultimate point of the camera adjustment for reproduction work, and the novel means for directly effecting this adjusting is provided for the purpose of conforming to certain screen ratio requirements in half-tone work according to several different theories of operation, and based on either the physical aperture or the effective optical aperture, or for the purpose of accomplishing light intensity control in making continuous tone reproductions or in similar work.

The mechanical features of certain preferred forms of diaphragm control means under the present invention will now be described.

Prior proposals looking toward greater facility in rotating the diaphragm collars in order to adjust the aperture have involved the provision of a radial arm or pointer attached to the collar and moving along an arcuate scale or dial calibrated in appropriate ways for determining the setting of the control. In these older arrangements, when multiple scales are employed, the scales disposed nearer to the center of the lens are shorter and the graduations must obviously be disposed more closely together. Even in this respect of mechanical considerations, the present invention represents an improvement over these older types of controls. It is also designed to permit of even finer adjustments of the aperture by providing a vernier arrangement. In the previously proposed controls, the length of the radial arm, which determines the ease with which the collar can be rotated, is limited by practical considerations. These advantages are primarily attained by the provision of a rectangular scale and means whereby the pointer is given a rectilinear movement.

In Figures 2, 3, and 4 of the drawing there is illustrated an embodiment of the invention which is adapted to be employed in connection with a dark room type of camera wherein all adjustments must be made from the rear end of the installation which is located inside the dark room. This embodiment involves a remote control effected by means of the use of Selsyn motors. This system involves two Selsyn units one of which is in the dark room at the rear of the camera and the other is mounted upon the lens board. These units are electrically connected so that when the rotor of the first unit is turned through an angle, the rotor of the second unit rotates through a corresponding angle. As will be readily seen from Figures 3 and 4, the first motor unit 70 is mounted within a box 71 as by means of a supporting bracket 72 secured thereto. The motor shaft 74 projects through an opening in the front wall 73 of the box and has a hand wheel 75 fixed upon the end thereof. The hand wheel may be provided with a crank handle 76 for ready manipulation. Inwardly of the front wall 73 of the box, the motor shaft 74 carries a pinion 77 which meshes with a relatively large gear wheel 78 mounted on a stub countershaft 79 which projects through an opening in the wall 73. Upon the outer exposed end of the shaft 79 there is mounted a pinion 80 which corresponds functionally to the pinion 37 described in the proceeding embodiment, since it is adapted to move the rack 45B which carries the pointer 50B associated with the interchangeable dial 55B, this dial 55B being calibrated according to empirical or symbolic *f* numbers instead of in ratios, and adapted for use in the multiple *f* system of operation.

The receiving unit of the Selsyn control is shown at 85 in Figure 4 of the drawing, this unit being mounted upon the lens board of the camera, the two units 70 and 85 adapted to be electrically connected by means of the cable 86. The shaft 88 of the Selsyn motor unit 85 is provided with a worm 89 which meshes with the worm gear 90, this gear being mounted upon the end of a stub shaft 91 rotatably carried by the lens board 18B. A pinion 92 is also carried by this shaft and meshes with the ring gear 30B which is fixed to the adjusting collar 26B of the camera lens assembly 20B.

It will be readily understood that for each angular displacement of the control crank 75, 76 on the control unit, the pointer 50 B will be moved a corresponding degree along the dial 55B and the motor 70 will have its rotor displaced through the same angle. Through the proper electrical connections, well known in this art, the other Selsyn motor 85 will have its rotor displaced through the same angle. This will cause the rotation of the ring gear 30B and thus the diaphragm adjusting collar 26B, through the intermeshing elements 89, 90, 91, and 92. Thus a remote control of the diaphragm in accordance with the various purposes and functions of the invention may be obtained.

It will thus be seen that by means of the present invention process camera operations both in connection with half-tone and continuous tone work is greatly facilitated and rendered much more accurate. It will also be understood that various changes and modifications may be made in the embodiments illustrated and described herein without departing from the scope of the invention as determined by the following claims.

Having thus described the invention, what is claimed as new and desired to be secured by Letters Patent is:

1. A process camera installation which comprises a camera proper including negative holder, lens board, and bellows, a lens and diaphragm unit mounted on said lens board and provided with a diaphragm aperture adjusting element, a remote control means comprising an actuator adapted to be located at a distance from the lens board and comprising a Selsyn motor member, manual means for angularly displacing the shaft of said motor member to a degree proportionate to the desired adjustment of the lens aperture, a mated Selsyn motor member at the lens board and operatively connected to the aperture adjusting element, and electrical connections between said Selsyn motor members.

2. A process camera installation which comprises a camera proper including negative holder, lens board, and bellows, a lens and diaphragm unit mounted on said lens board and provided with a diaphragm aperture adjusting element, the installation being such that access to the negative holder may be had only from a dark-room located at the rear of the camera; means for controlling the diaphragm from said dark-room comprising an actuator unit located in said dark-room and including a Selsyn motor member, a manual control element and an indicator element arranged to move across a graduated dial, both of these elements being operatively connected with the shaft of said motor member for proportionate movement therewith; a mated Selsyn motor member mounted on the lens board and means operatively connecting the shaft of said last named motor member with the aperture adjusting element; and electrical conductors connecting the two Selsyn motor members.

HENRY R. LONG.